United States Patent [19]

Dodson et al.

[11] Patent Number: 4,481,176

[45] Date of Patent: Nov. 6, 1984

[54] TREATMENT FOR PHOSPHORUS-CONTAINING WASTE MATERIAL

[75] Inventors: David L. Dodson, Columbia; Bruce D. Pate, Winchester; Philip C. Rogers, Columbia, all of Tenn.

[73] Assignee: Stauffer Chemical Company, Westport, Conn.

[21] Appl. No.: 538,696

[22] Filed: Oct. 3, 1983

[51] Int. Cl.³ .................... C01B 25/01; C01B 25/02; C01B 25/04

[52] U.S. Cl. .................. 423/322; 423/316; 423/323; 210/778; 210/906

[58] Field of Search ............. 210/778, 906; 423/322, 423/323, 316

[56] References Cited

U.S. PATENT DOCUMENTS

| | | | |
|---|---|---|---|
| 3,084,029 | 4/1963 | Barber et al. | 423/323 |
| 3,113,839 | 12/1963 | Barber et al. | 423/316 |
| 3,684,461 | 8/1972 | Muller et al. | 210/906 |
| 4,399,037 | 8/1983 | Diskowski et al. | 210/906 |
| 4,402,833 | 9/1983 | Bennett et al. | 210/906 |

*Primary Examiner*—Gregory A. Heller
*Attorney, Agent, or Firm*—Vivienne T. White

[57] ABSTRACT

The invention is directed to a process for recovering elemental phosphorus values from phosphorus-containing waste materials. The process comprises reducing the size of the solid particulate materials of the sludge and forming a uniform homogenous sludge which is filtered through a high-pressure thin-cake filter resulting in a filtrate high in phosphorus values.

The invention also discloses a pump retrieval means for retrieving the sludge from contaminated disposal areas and a preconditioning dewatering means for thickening and clarifying the sludge prior to comminuting the solids contained therein and filtrating to recover the phosphorus values contained therein.

8 Claims, 1 Drawing Figure

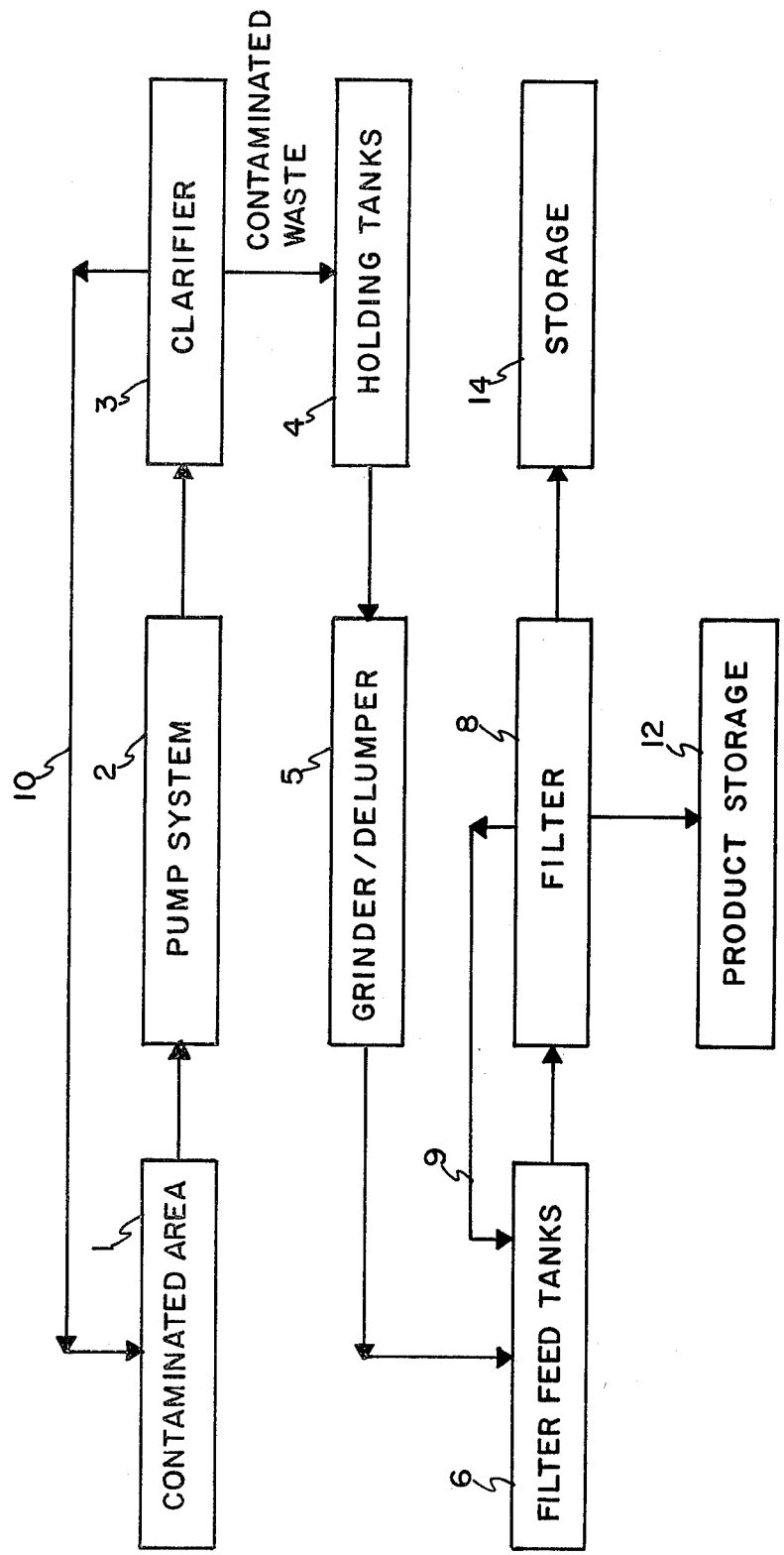

TREATMENT FOR PHOSPHORUS-CONTAINING WASTE MATERIAL

BACKGROUND OF THE INVENTION

The present invention relates to an improved process for recovering elemental phosphorus from phosphorus-containing waste material, and more particularly from the phosphorus-containing waste material formed during the production of elemental phosphorus by the smelting of phosphate rock.

The basic method for producing elemental phosphorus is accomplished by the reduction of phosphate rock with coke or other carbonaceous reducing agents in the presence of silica. This is referred to as the furnace "charge" or "burden". The phosphorus production is generally carried out in an electric furnace at a reaction temperature of about 1,400° to about 1,500° C.

The mechanism of the reduction of phosphate rock to elemental phosphorus is quite complex and the exact path of the reaction sequence has not been conclusively defined. The overall reaction is generally represented by the following simplified equation:

$$2Ca_3(PO_4)_2 + 6SiO_2 + 10C \rightarrow 6CaSiO_3 + 10CO + P_4$$

During the course of the reaction, the phosphorus produced vaporizes, rises, and is cooled, condensed, and collected under water. The phosphorus vapor is generally accompanied by carbon monoxide and appreciable quantities of entrained dust comprising phosphate burden, fluorine, calcium oxides, potassium oxides and the like. The dust and vapor mixture can be passed through an electrostatic precipitator where most of the dust is removed prior to cooling the phosphorus vapor. The carbon monoxide gas can be recovered for use as fuel or properly disposed of in accordance with pollution requirements. Solid furnace residue comprising calcium silicate is drawn off from the bottom of the furnace as a molten liquid. Iron phosphide or "ferrophosphorus" formed from the iron impurities present in the phosphate ore is also drawn off as a melt from the bottom of the furnace.

The condenser drains into a sump wherein the phosphorus product is collected. Three separate layers generally form in the condenser sump.

A layer of relatively high grade phosphorus is obtained at the bottom. The intermediate layer is a mixture referred to as "sludge", which consists of phosphorus droplets or globules, solid impurities, and water. Above the phosphorus-containing waste material layer is a water layer. The boundary between the phosphorus-containing waste material layer and the water layer is not clearly defined.

The amount of phosphorus-containing waste material produced will vary, depending upon factors such as the initial composition of phosphate rock charged, the operating conditions and design of the furnace. Phosphorus-containing waste material can contain from about 5% to about 90% by weight elemental phosphorus. The phosphorus content of the phosphorus-containing waste material produced can vary from about 10 to about 60 weight percent or more, of the furnace output of elemental phosphorus.

The phosphorus-containing waste material, or "sludge" as the term is used in the art and herein, appears to be a poorly defined emulsion containing solid impurities, water and phosphorus in widely varying proportions and having a density between the density of phosphorus and the density of water. The phosphorus-containing waste material can have the characteristics of a "phosphorus in water" type emulsion, that is, the phosphorus being the discontinuous phase and the water being the continuous phase, or a "water in phosphorus" type emulsion, that is, the water being the discontinuous phase and the phosphorus being the continuous phase. Microscopic examination of the phosphorus in water type phosphorus-containing waste material shows that the phosphorus is present in small globular particles which will not coalesce. The size of the particles are generally in the range of sub-micron to millimeter, and larger dimensions.

Various methods for recovering elemental phosphorus from phosphorus-containing waste material have been suggested in the prior art. Among these are physical methods for separating the phosphorus, such as filtration, distillation, stirring and settling, vibration, centrifuging, extractions, electrolysis, and the like.

Presently, phosphorus produced in electric arc furnaces can be further processed by batch filtration techniques. The batch filtration method consists of performing several filter runs on production mud, transferral of remaining material through various tanks (allowing additional settling of phosphorus), then refiltering again. Prior to each of the three runs, diatomaceous earth is used to precoat the filters.

The resulting unfilterable phosphorus-containing waste material is then further processed usually by thermal means such as a "mud" furnace, roaster, or recycled back to the electric furnace to evaporate the phosphorus contained in the sludge as well as reversion of red phosphorus to yellow phosphorus and its subsequent evaporation. The resulting evaporated/condensed phosphorus will then be recycled to the batch filters. The following analogy will incorporate the use of a roaster to thermally treat the sludge although the following disadvantages listed will be analogous to all the before mentioned methods of thermally treating sludge.

The roasting operation has become more expensive due to rising energy costs. It is also hazardous due to pressures generated inside the roaster. In addition, roasting leads to high $P_2O_5$ emissions, a pollution problem. Other disadvantages are: the average batch filtration efficiency is 60% by volume; the present system involves considerable transfer of phosphorus bearing material among various tanks and its inherent associated risks; and the relatively low filtration efficiency results in an undue load to the roaster operations. Other methods for treating the phosphorus-containing waste material include burning it and making low grade phosphoric acid.

U.S. Pat. No. 3,684,461 discloses a process for treating the waste water containing phosphorus-containing waste material obtained in the electrochemical production of elemental phosphorus. The disclosed process comprises filtering the water in a filtration zone and drying the filter cake a plurality of times. Gaseous and vaporous matter recovered from the drying zones are conveyed to a condensation zone where the phosphorus and water contained therein is condensed and recovered.

The present invention achieves the recovery of phosphorus values from phosphorus-containing waste material by transporting the phosphorus-containing waste material from a contamination site, preconditioning the transported phosphorus-containing waste material, and sizing the solid constituents of the phosphorus-containing waste material as well as homogenizing the stream and filtering to obtain the phosphorus values therefrom.

SUMMARY OF THE INVENTION

The invention is a recovery process for phosphorus values from phosphorus-containing waste material generated in the production of phosphorus. The process comprises the steps of (a) sizing the phosphorus-containing waste material to obtain a suitable particle size and homogenizing the stream to obtain a consistent filter feed;

(b) passing the phosphorus-containing waste material from step (a) through a continuous thin-cake filter to produce a filtrate high in elemental phosphorus values; and (c) recovering the elemental phosphorus values from the filtrate.

The invention can additionally comprise means for retrieval of the phosphorus-containing waste material from contaminated locations and processing it to form sludge slurry, dewatering the sludge slurry and introducing it to step (a) above.

BRIEF DESCRIPTION OF THE DRAWINGS

FIG. 1 is an illustrative example of an embodiment of the process of the invention.

DETAILED DESCRIPTION OF THE INVENTION

The invention is directed to a process of treating and recovering phosphorus-containing wastes and especially the waste derived from the production of elemental phosphorus by electrothermal means.

In an embodiment of the invention the phosphorus contaminated waste is retrieved from contaminated areas (such as ponds, dump sites, etc.) by any means known in the art such as, for instance, dredge pumps, clam shells, and the like. The retrieval of the waste material in some instances requires the addition of water to assist the retrieval mechanism by producing a more fluid slurry or sludge material. The slurry is then pumped to a sedimentation facility where it is clarified and partially dewatered with the water being recycled back to the contamination site to slurry additional phosphorus contaminated waste when necessary. The clarified material is thereafter conveyed to a sizing device where the size of the solid constituents is reduced to provide a uniform size distribution and a homogenized feed stream.

The feed stream is then conveyed to a continuous high pressure thin cake filter at which point the liquid medium is filtered through its own unfilterable constituents, or through other filterable or unfilterable constituents which can be added to enhance the quality of filtration.

The unfilterable constituents are then recycled, discarded or stored depending on the type of conditions required by the nature of the feed stream and for the product desired.

The equipment suitable for use in the practice of the invention are all commercially available. In the practice of the invention, for instance, the retrieval of the contaminated waste can be accomplished using a Marconaflo Reclaim System utilizing a DYNAJET ® vertical slurry pump, which utilizes high pressure water sprays to break up solids, including solid phosphorus, with pumping of the material to a holding area.

A thickener-clarifier device is used to dewater the slurry since the reclamation process results in a very low percentage solids stream. The sludge should be thickened to a solids weight percent of from about 5% to about 20% and preferably from about 10% to about 15%. If not clarified, the stream would be too diluted and the filter would filter water preferentially over phosphorus.

After being clarified, the sludge is conveyed to holding tanks where it is heated to from about 45° C. to about 100° C. and preferably from about 55° C. to 60° C. to liquify the solid phosphorus.

The sludge is further conditioned in a sizing device such as, for instance, a Rietz disintegrator obtainable from the Rietz Division of Bepex Corporation, P.O. Box 880, Santa Rosa, Calif. In the sizing operation, the sludge solids are reduced to a maximum particle size of not greater than about 6385 microns (¼ in.) and preferably not greater than 1560 microns (1/16 in.) both for consistency and to allow subsequent filtration. The sludge feed is also homogenized to insure that the solids content and particle size distribution of the feed to the filter is consistent and this in turn improves the clarity of the filtrate.

The solids content of the sludge should have a particle size distribution of from sub-micron to about 1560 microns, more desirably from about 1 micron to about 1000 microns.

The phosphorus-containing sludge is then filtered using a filtration device capable of filtering the phosphorus and phosphorus sludge continuously by filtration of the liquid medium through its own unfilterable constituents and continuously discharging said unfilterable constituents such that a waste filter cake is discharged.

Filtering devices such as a continuous pressure or vacuum filter are suitable for use with the process disclosed. The invention is more fully understood by reference to the drawing.

FIG. 1 discloses a process of recovering elemental phosphorus values from phosphorus contaminated waste material. In the schematic embodiment presented by FIG. 1, contaminated phosphorus waste material is removed from a contaminated waste site 1 by a retrieval mechanism 2 generally comprises of a pump means constructed of materials that are able to withstand the low pH conditions (2-4) of the phosphorus-containing waste materials. The material is conveyed to dewatering facilities 3 where the sludge is thickened and clarifying with addition of clay or polymers, or other clarification aids when necessary. Thereafter, the clarified sludge is conveyed to holding tank 4 where it is heated and maintained at a temperature above 45° C. to liquify the elemental phosphorus contained therein and keep it in solution.

From the holding tanks the slurry is conveyed to a grinder/delumper 5 where the slurry is further conditioned by reduction of the solids to a uniform particle size distribution and homogenized to insure a consistency of feed to a filter feed tank 6 or directly to a continuous high-pressure, thin-cake filter 8 by pump means such as a positive displacement pump capable of pumping at high pressures without undue wear or corrosion (e.g., a Moyno pump obtainable from Moyno Products, Robbins and Meyers, Inc., Springfield, Ohio). The filtrate is recovered after filtration through filtrate ports. During filtration the temperature is maintained at at least 45° C. to maintain the elemental phosphorus in liquid form. Preferably, it is maintained at from about 52° C. to 60° C. throughout the filtration process but temperatures of from about 45° C. to 100° C. are generally acceptable.

With the homogenized feed stream the filter exhibited preference for filtering out phosphorus, rather than water.

The factors determining the preference for filtering phosphorus are the composition of the feed, the filter media pore size (generally less than 2 micron), the filter operating pressure which should range from about 3.5 to about 21 kg/cm$^2$ and preferably from about 7 to about 14 kg/cm$^2$ and the filter operating temperature (plus 45° C., but preferably above 55° C.), as well as surface tension, capillary action, and possibly polarity of the separate components of the phosphorus-containing sludge.

The recycled portion of the filter feed stream is then recycled back to the filter feed tank 6 via line 9 where it is again homogenized and reintroduced to the filter until the filter switches from preferentially filtering phosphorus to preferentially filtering water. Similarly water removed during the clarification and dewatering process 3 is recycled back to 1 to assist in the reclamation of the sludge via line 10.

During filtration the recovered liquid phosphorus values are continuously conveyed to product storage tank 12 where it is stored under water. The filter cake is conveyed to storage 14.

The resulting unfilterable constituents are then easily dewatered by solid bowl centrifuges, belt presses, or any other dewatering devices which are readily commercially available, and then heat treated to convert solid red phosphorus to yellow phosphorus. The yellow phosphorus is subsequently evaporated and condensed and recycled back to the filter system for processing. The resulting solid constituents can then be either sent back to the electric furnaces or sold as by-product fertilizer additives.

It is within the scope and practice of the invention to convey the sludge directly to the grinder/delumper device 5 after its generation and without any prior conditioning. However, since it has been the practice in the art to convey the vast amounts of generated sludge waste to settling ponds or other storage means where it is dewatered, retrieval means as disclosed in the Figure, 1-4, in such instances, are necessary to produce a conditioned slurry which can be conveyed to a grinder/delumper mechanism 5.

What is claimed:

1. A process of recovering elemental phosphorus values from phosphorus-containing waste material comprising the steps of:
   (a) sizing the solids content of phosphorus-containing waste material to provide a suitable particle size for filtration as well as a homogenized feed in the resulting filter feed stream to obtain a consistent filter feed;
   (b) passing the phosphorus-containing waste material from step (a) through a continuous thin-cake filter where the phosphorus values are filtered through unfilterable material to produce a filtrate high in elemental phosphorus values; and
   (c) recovering the elemental phosphorus values from the filtrate.

2. The process of claim 1 further comprising means for retrieving the phosphorus-containing waste material from contaminated locations and means for dewatering the waste prior to sizing.

3. The process of claim 1 wherein the solid particles are sized to less than about 6385 microns.

4. The process of claim 3 wherein the particles after sizing are from sub-micron to about 1560 microns.

5. The process of claim 1 wherein the sludge is conveyed to the filter by means of a positive displacement pump capable of pumping at high pressure.

6. The process of claim 1 wherein the sludge is maintained at a temperature above about 45° C. during steps (a) and (b).

7. The process of claim 2 wherein the sludge is heated to at least 45° C. after dewatering.

8. The process of claim 2 wherein the means of retrieving the phosphorus-containing waste material comprises a pump utilizing high pressure water sprays to break up solids.

* * * * *